United States Patent [19]
Duncan

[11] 3,884,214
[45] May 20, 1975

[54] CHARCOAL STARTER AND GRILL

[76] Inventor: John A. Duncan, 843 Central, Coos Bay, Oreg. 97420

[22] Filed: June 14, 1973

[21] Appl. No.: 369,932

[52] U.S. Cl. ............................. 126/25 B; 126/9 R
[51] Int. Cl. ............................................. F24c 1/16
[58] Field of Search......... 126/25 B, 9 R, 25 R, 9 B; 110/1 F; 220/7

[56] References Cited
UNITED STATES PATENTS

| | | | |
|---|---|---|---|
| 1,491,080 | 4/1924 | Clark | 126/9 R |
| 2,920,614 | 1/1960 | Phelps | 126/25 R |
| 2,988,082 | 6/1961 | Kuhn | 126/25 R |
| 3,453,975 | 7/1969 | Gunter | 110/1 F |

FOREIGN PATENTS OR APPLICATIONS

| | | | |
|---|---|---|---|
| 868,164 | 1/1971 | Canada | 126/25 R |

*Primary Examiner*—William F. O'Dea
*Assistant Examiner*—Harold Joyce
*Attorney, Agent, or Firm*—Harvey B. Jacobson; Clarence A. O'Brien

[57] ABSTRACT

A combined charcoal starter and grill comprising a vertically elongated rectangular sleeve open at the upper and lower ends and incorporating air inlet holes peripherally thereabout adjacent the base or lower end of the sleeve. The sleeve includes first and second sets of opposed slots for the selective reception of a charcoal support consisting of an expanded metal panel surrounded by a rigid metal frame and including a laterally projected heat insulating wooden handle. The sleeve can be constructed with a removable front wall and hingedly interconnected side and rear walls so as to collapse into a flat easily stored or transported package.

1 Claim, 8 Drawing Figures

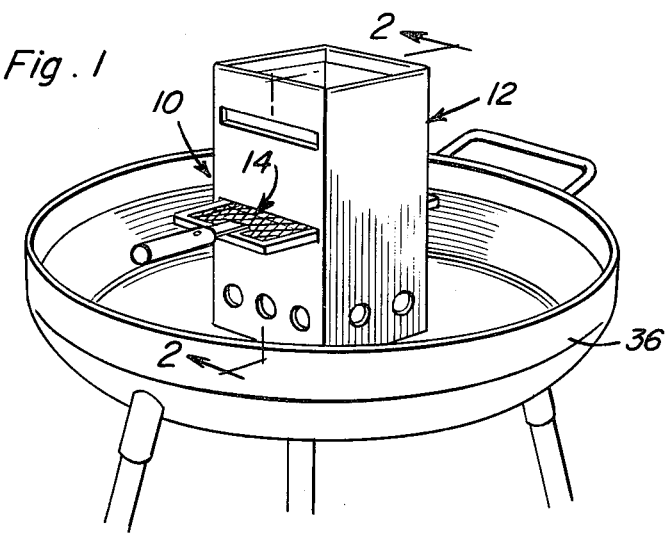
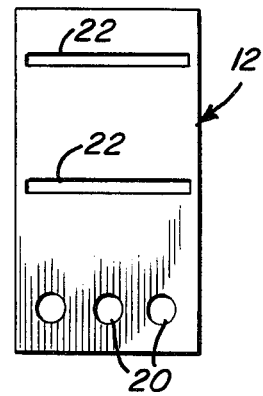
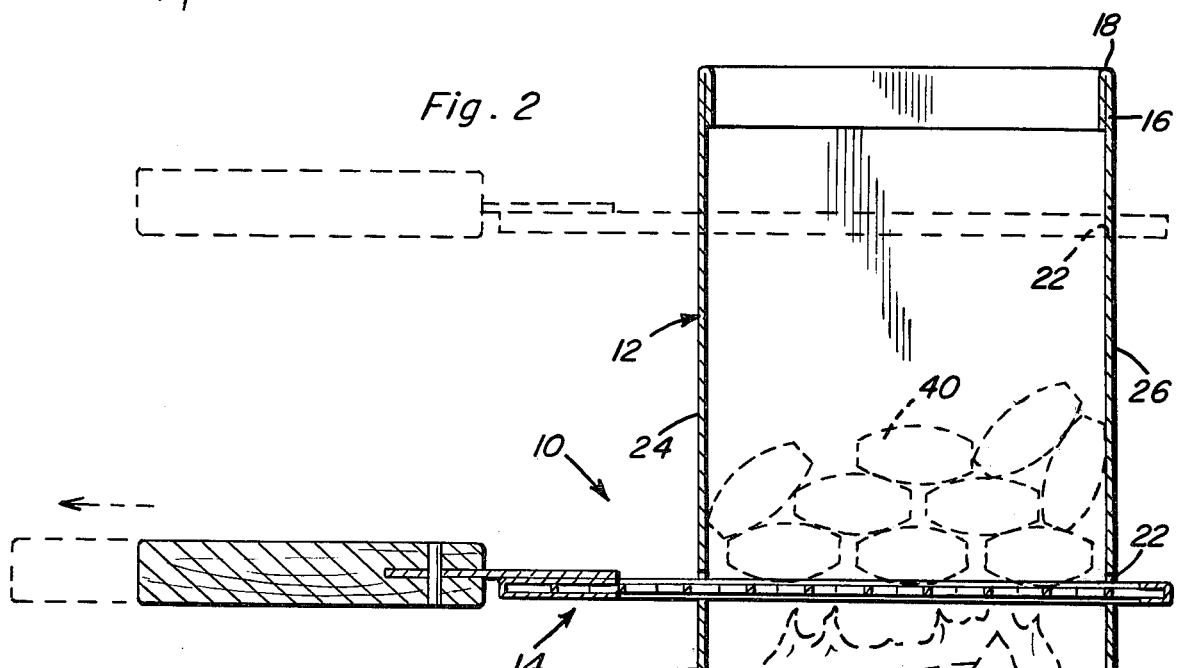
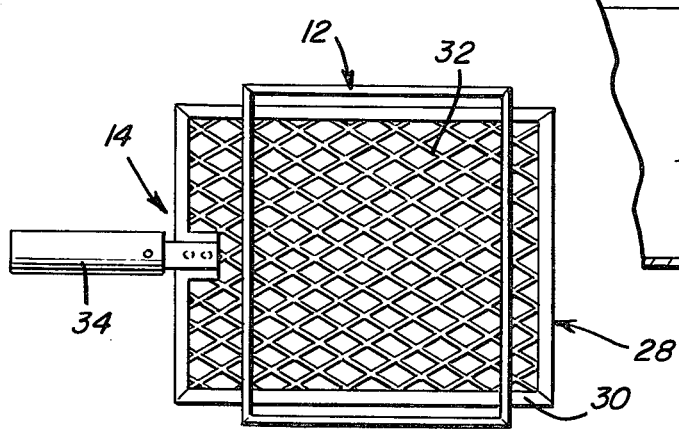

PATENTED MAY 20 1975 3,884,214

CHARCOAL STARTER AND GRILL

The present invention relates to a combined charcoal starter and grill or stove.

More specifically, the invention is directed to a sleeve-like structure which is uniquely adapted so as to preheat charcoal, for outdoor barbecuing and the like, in a simple, safe and highly effective manner utilizing only a small amount of crumpled newspaper and no dangerous liquid fire-starting materials.

In conjunction with the use of the device as a charcoal starter, it is particularly significant that the basic construction of the device enables its use as an actual cooking grill or stove, providing convenient food or food receptacle receiving surfaces and a self-contained fire area.

The basic unit itself can, in one form, collapse into a flat pack easily stored as well as carried by hikers, campers, and the like.

The actual handling of the unit during the use thereof as either a charcoal starter or camp stove is effected through an insulated, normally wood, handle affixed to a large support plate which is selectively inserted within and between opposed support slots provided in the main fuel receiving sleeve.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a perspective view of the device of the invention in operative position within a charcoal receiving fire bowl;

FIG. 2 is an enlarged cross-sectional view taken substantially on a plane passing along line 2—2 in FIG. 1;

FIG. 3 is a top plan view of the device;

FIG. 4 is an end elevational view of the main fuel receiving sleeve;

Figure 5:
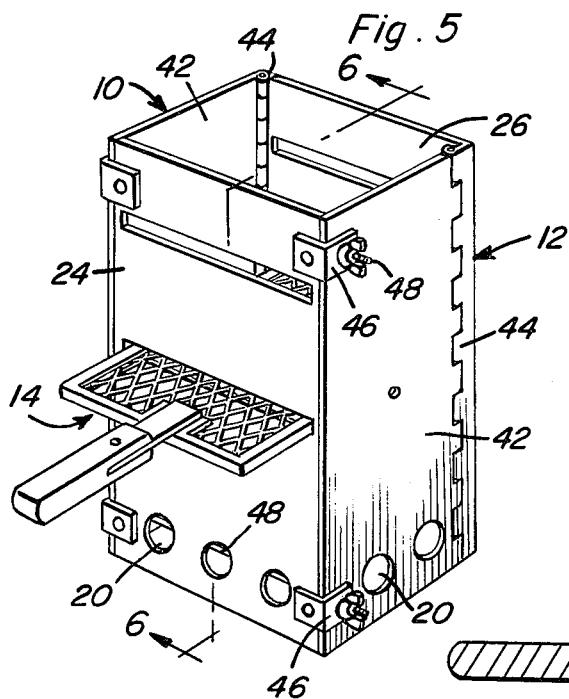
FIG. 5 is a perspective view of a collapsible form of the device.

Referring now more specifically to the drawings, reference numeral 10 is used to generally designate the combined charcoal starter and grill comprising the invention. This device consists basically of a vertical rectangular sleeve 12 and a charcoal support 14.

The rectangular sleeve 12 is preferably approximately 12 inches high, 7 inches wide and 5 inches deep with an inwardly bent upper edge flange 16 providing a smooth exposed upper edge 18. A plurality of relatively large air inlet holes 20 are provided within each of the sleeve walls at a height slightly above the bottom edge of the sleeve 12 to provide for an intake of combustion supporting air. Two pairs of aligned slots 22 are provided in the front and rear walls 24 and 26 with the lower pair of slots 22 being at approximately mid-height and the upper pair of slots slightly below the top of the sleeve 12. Each of the slots is approximately ⅜ inch high and 6 ½ inches wide.

The pairs of slots are specifically provided for the accommodation of the charcoal support 14. This charcoal support includes a support plate or panel 28 consisting of a rectangular frame 30, approximately six by eight inches, and an expanded mesh charcoal supporting body portion 32 mounted within and supported by the frame 30. The entire support 14 is easily handled and manipulated by an elongated handle 34 affixed to and projecting from the central portion of one edge of the plate 28, the handle 34 having appropriate heat insulating characteristics, being formed of or covered by wood or any other appropriate material which will enable it to be easily grasped in the hand during the operation of the starter.

As will be appreciated from the drawings, the plate or panel 28 is received through the opposed slots 22 of either pair of slots so as to span the interior of the sleeve 12, the relatively thicker nature of the handle 34 acting, if necessary, as a limit to the inward insertion of the support 14.

In use, the sleeve 12 is positioned upright within the conventional barbecue fire bowl 36. Wadded newspaper 38 is placed within the lower portion of the sleeve 12 and the charcoal support 14 introduced through the lower set of slots 22. Charcoal 40 is then placed on the support panel 28 within the sleeve 12 and the paper lit. The sleeve 12, with the lower intake holes 20 acts somewhat in the nature of a chimney with the combustion supporting air moving upwardly through the burning paper so as to provide for a concentrated heating of the charcoal 40. Once the charcoal 40 has been properly heated, that is reached a point wherein a self-sustained burning of the charcoal has resulted, the charcoal support 14 is grasped by the handle 34 and withdrawn, allowing the charcoal 40 to fall into the fire bowl 36. The support 14 can then be inserted within the upper pair of slots 22 and the sleeve 12 removed. If so desired, a small amount of charcoal 40 can be started with the charcoal support 14 inserted within the upper pair of slots 22. By the same token, the device 10 can actually constitute the stove or grill either by retaining the charcoal 40 on the support panel 28 and placing an appropriate food receptacle on the upper end of the sleeve 12 or by dropping the charcoal 40 to the bottom of the sleeve 12 and using the support plate 28 as a food receiving grill when positioned within the upper pair of slots 22. Regardless of the specific manner of use of the device 10, it will be appreciated that the relatively tall constant cross-sectional nature of the sleeve 12, in conjunction with the large air intake openings 20 completely about the lower portion thereof, insures a proper combustion of the fuel, that is the paper 38, and an effective starting of the charcoal 40.

Figure 6:
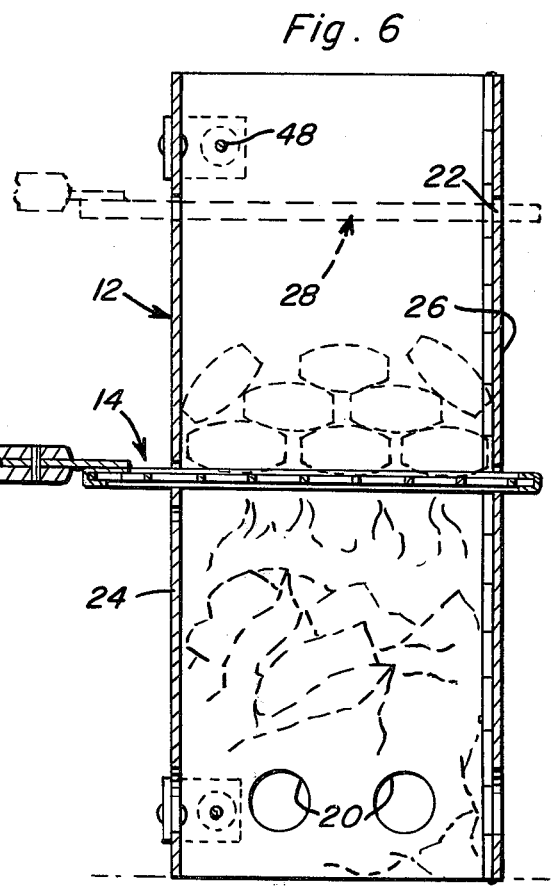
FIG. 6 is an enlarged cross-sectional view taken substantially on a plane passing along line 6—6 in FIG. 5.
Figure 7:
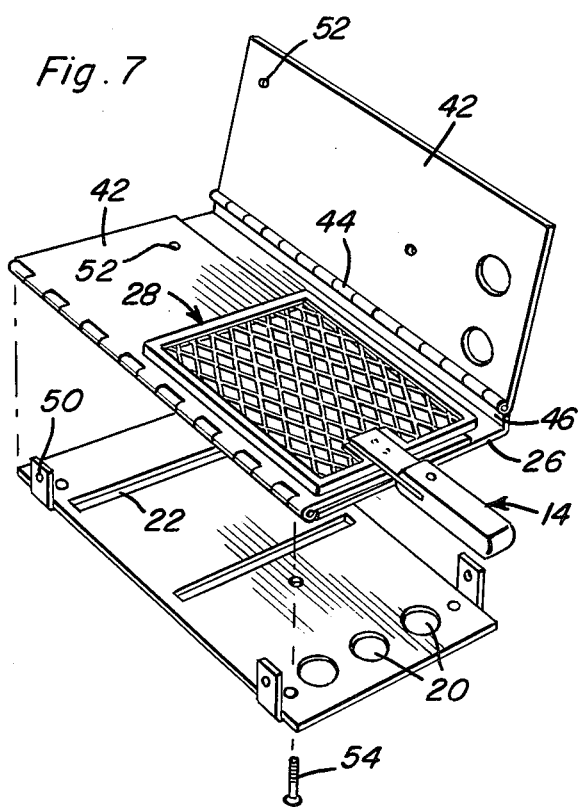
FIG. 7 is an exploded view of the components illustrating the manner of collapsing and packaging the device.
Figure 8:
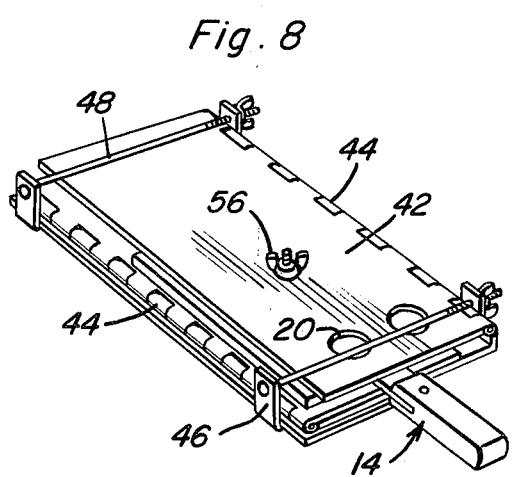
FIG. 8 is a perspective view of the completely collapsed device.

With reference to FIGS. 5–8 in particular, it will be appreciated that the device 10 can be made so as to collapse into a flat package for ease of storage or transportation, for example by campers or hikers.

In making the device 10 collapsible, the front wall 24 is to be completely removable with the opposed side walls 42 each hinged, by a continuous or piano-type hinge 44, to the opposed sides of the rear wall 26. It will be noted that one edge portion 46 of the rear wall 26 is turned at a right angle and projects slightly forward so as to position the corresponding side wall mounting hinge 44 inwardly of the rear wall 26 whereby, upon a folding of the side walls 42 as suggested in FIGS. 7 and 8, the side walls will properly overlie each other with the support panel portion 28 of the charcoal support 14 conveniently received therebetween.

The removable front wall is provided with upper and lower pairs of metal angle mounting straps 46, each of which has one leg affixed to the forward face of the front panel 24 and a second leg which projects rearwardly therefrom into overlying relation to the outer face of an adjacent side panel 42. As will be appreciated from FIG. 5, the forward portion of each side panel 42 engages against the side edge of the front panel 24 between this front panel side edge and the rearwardly projecting flanges of the corresponding straps 46, thus in effect trapping the forward edges of the side walls 42. The front wall 24 is locked into position and the entire sleeve stabilized by upper and lower elongated threaded bolts 48 which extend through apertures 50 in the flanges of the straps 46 and aligned apertures 52 in the adjoining portions of the side walls 42. These bolts 48 can either have an enlarged head on one end and a butterfly nut receiving second threaded end or, as an alternative, can have both ends threaded for the reception of enlarged easily manipulated butterfly nuts.

When collapsed, the removable front wall 24 acts in effect as a tray for the reception of the folded side and rear walls, as well as the received charcoal support 14. The assembly bolts 48 can then be used to tie together the collapsed device by engagement between the pairs of upstanding strap flanges as will be noted in FIG. 8. Finally, a threaded locking bolt 54 can be extended centrally through the overlying collapsed walls with an appropriate butterfly nut 56 engaged therewith to provide for a more positive locking together of the collapsed components.

As will be appreciated, the use of the collapsible form of the device 10 will be the same as that described supra with the collapsible form providing the added convenience of easy portability and storage, particularly on hikes, camping trips and the like during which the device can function equally as a charcoal starter or a camp stove.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A combined charcoal starter and grill comprising a vertically elongated rectangular sleeve, said sleeve having a constant cross-sectional area throughout the full height thereof, said sleeve comprising a front wall, a rear wall, and opposed side walls, combustion air intake holes provided through the lower portion of each of the sleeve walls, an elongated charcoal support, said charcoal support comprising a flat panel-like portion including a rigid frame and a flat expanded mesh section supported thereby, and a wooden handle fixed to the frame and projecting outwardly therefrom, first and second pairs of opposed slots formed within said front and rear walls for the selective reception of the charcoal support therethrough and therebetween, said first pair of slots being located at approximately mid-height on the sleeve, said second pair of slots being located between the first pair of slots and the upper end of the sleeve, said sleeve being collapsible, said front wall being removable, said side walls each being hinged, along one edge thereof, to the corresponding side of the rear wall for an orientation of all of the walls into a collapsed position in overlying parallel relation to each other, said front wall including upper and lower pairs of edge mounted rearwardly projecting strap legs positionable in overlying relation to the erected opposed side walls, and upper and lower securing bolts received through the strap legs and adjoining side wall portions for a retention of the front wall to and between the erected side walls.

* * * * *